(12) United States Patent
Pallares et al.

(10) Patent No.: US 9,199,588 B2
(45) Date of Patent: Dec. 1, 2015

(54) ALTERNATOR WITH LOCKOUT MODE

(71) Applicant: Remy Technologies, LLC, Pendleton, IN (US)

(72) Inventors: German Holguin Pallares, Noblesville, IN (US); William Bowman, Fishers, IN (US); Mingshe Zhou, Fishers, IN (US)

(73) Assignee: Remy Technologies, LLC, Pendleton, IN (US)

( * ) Notice: Subject to any disclaimer, the term of this patent is extended or adjusted under 35 U.S.C. 154(b) by 354 days.

(21) Appl. No.: 13/875,765

(22) Filed: May 2, 2013

(65) Prior Publication Data

US 2013/0293194 A1    Nov. 7, 2013

Related U.S. Application Data

(60) Provisional application No. 61/641,628, filed on May 2, 2012.

(51) Int. Cl.
| | |
|---|---|
| *H02J 7/00* | (2006.01) |
| *H02P 9/00* | (2006.01) |
| *B60R 16/03* | (2006.01) |
| *H02J 7/14* | (2006.01) |
| *H02J 7/16* | (2006.01) |

(Continued)

(52) U.S. Cl.
CPC .............. *B60R 16/03* (2013.01); *F02N 11/084* (2013.01); *H02J 7/14* (2013.01); *H02J 7/16* (2013.01); *H02P 9/48* (2013.01); *H02P 29/0044* (2013.01); *F02N 2200/0809* (2013.01); *F02N 2300/104* (2013.01); *H02P 2101/45* (2013.01); *Y02T 10/48* (2013.01)

(58) Field of Classification Search
CPC ............... H02P 9/30; H02P 9/14; H02P 9/04; H02P 9/307; H02P 9/48; H02J 7/14; H02J 7/16
USPC ............................................. 320/109; 322/28
See application file for complete search history.

(56) References Cited

U.S. PATENT DOCUMENTS 3,159,781 A    12/1964   Shano
3,673,489 A *  6/1972   Riff ................................ 322/28

(Continued)

FOREIGN PATENT DOCUMENTS

| JP | 10-002215 A | 1/1998 |
|---|---|---|
| JP | 10-331628 A | 12/1998 |
| WO | WO 2010/095212 A1 | 8/2010 |

OTHER PUBLICATIONS

International Preliminary Report on Patentability and Written Opinion; PCT/US2013/039238; Nov. 13, 2014; 8 pages.

(Continued)

*Primary Examiner* — M'Baye Diao
(74) *Attorney, Agent, or Firm* — Bose McKinney & Evans LLP

(57) ABSTRACT

A lockout circuit which limits the field voltage in an alternator while the vehicle starter is activated. The lockout circuit may be configured to limit the field voltage while the charging circuit voltage is below a threshold value. A timer circuit may advantageously be employed with the lockout circuit. A temperature compensating function may also be employed to change the threshold value in response to temperature changes. The disclosed circuit is particularly advantageous when employed in cold weather conditions. A method of starting the engine of a vehicle is also disclosed.

20 Claims, 5 Drawing Sheets

(51) Int. Cl.
*H02P 9/48* (2006.01)
*H02P 29/00* (2006.01)
*F02N 11/08* (2006.01)
*H02P 101/45* (2015.01)

(56) References Cited

U.S. PATENT DOCUMENTS

| | | | | |
|---|---|---|---|---|
| 4,384,245 | A | * | 5/1983 | Metter ............... 322/28 |
| 4,458,115 | A | * | 7/1984 | Peterson ............ 200/61.85 |
| 4,670,705 | A | | 6/1987 | Sievers et al. |
| 4,920,308 | A | * | 4/1990 | Edwards et al. ........ 322/58 |
| 5,023,539 | A | | 6/1991 | Miller et al. ......... 322/28 |
| 5,066,866 | A | * | 11/1991 | Hallidy ........... H02J 7/1438 290/1 R |
| 5,245,271 | A | * | 9/1993 | Simmons ............. 322/60 |
| 5,252,926 | A | * | 10/1993 | Menegoli ............ 324/545 |
| 5,483,146 | A | | 1/1996 | Schultz et al. |
| 5,541,456 | A | * | 7/1996 | Maggioni et al. ...... 307/10.1 |
| 5,821,634 | A | | 10/1998 | Guthrie |
| 6,184,661 | B1 | | 2/2001 | Becker et al. |
| 6,373,230 | B2 | * | 4/2002 | Jabaji .................. 322/28 |
| 6,777,905 | B2 | * | 8/2004 | Maehara ............. 318/650 |
| 7,007,460 | B2 | | 3/2006 | Frieden et al. |
| 7,075,195 | B2 | * | 7/2006 | Feil .................... 307/142 |
| 7,393,243 | B2 | | 7/2008 | Iwatani et al. |
| 7,521,903 | B2 | | 4/2009 | Renehan et al. |
| 7,583,062 | B2 | | 9/2009 | Harmon et al. |
| 7,623,331 | B2 | * | 11/2009 | Harmon et al. |
| 8,019,293 | B2 | * | 9/2011 | Dagher et al. ....... 455/127.1 |
| 8,080,980 | B2 | | 12/2011 | Harmon et al. |
| 8,102,145 | B2 | | 1/2012 | Merrill et al. |
| 8,330,430 | B2 | | 12/2012 | Steele, Jr. et al. |

OTHER PUBLICATIONS

International Search Report and Written Opinion; PCT/US2013/039238; Sep. 25, 2013; 11 pages.

* cited by examiner

ALTERNATOR WITH LOCKOUT MODE

CROSS REFERENCE TO RELATED APPLICATIONS

This application claims priority under 35 U.S.C. 119(e) of U.S. provisional patent application Ser. No. 61/641,628 filed on May 2, 2012 entitled ALTERNATOR WITH LOCKOUT PHASE the disclosure of which is hereby incorporated herein by reference.

BACKGROUND

The present invention relates to automotive alternators and similar electrical machines and their controls.

Most modern automobiles include a charging system which include a battery, an alternator and a regulator. In such charging systems, the alternator is mechanically coupled to the engine whereby the engine will rotate the rotor of the alternator when the engine drive shaft is rotating. When the engine is operating, the alternator is used as a generator to recharge the battery and provide electrical power to various electrical loads, e.g., headlights, of the vehicle. Alternators are typically multiphase electrical machines, typically three-phase. The electrical power generated by the alternator is dependent upon several variables, two of the more significant variables are the engine speed, the rotational speed of the alternator rotor generally varies with the engine speed, and the voltage of the field coils on the rotor of the alternator.

A regulator senses the voltage of the charging system and regulates the voltage of the field coils of the alternator rotor to maintain the voltage of the charging system at the desired level as the engine speed and electrical loads vary. The battery not only acts as an electrical power reservoir but also acts as a buffer dampening such variations.

As a higher voltage is provided to the field coils, a greater torque will be required to rotate the alternator rotor at any one speed. In other words, when the voltage of the field coils is increased to increase the output of the alternator, the alternator will drain additional horsepower from the engine.

When initially starting the engine of a typical automobile, the battery powers an electrical starter motor which turns a flywheel and thereby turns over the engine. The starter provides torque to the engine for a brief period of time until the engine starts to operate normally and no longer needs assistance. Under colder conditions, the time required to start the engine is lengthened and the starter may be required to provide torque for a longer period of time.

In such cold start conditions when the starter is activated for a relatively long period of time, the voltage of the alternator field coils may be increased to normal operating levels while the starter is still activated. In such a situation, the alternator will be unnecessarily parasitic on the starter, draining mechanical energy from the engine as the starter is providing mechanical energy to the engine and thereby extending the crank time of the starter and lengthening the time required for the engine to reach a stable idle condition. Such a prolongation of the crank time and associated delay of stable idle condition is generally undesirable.

SUMMARY

The present invention provides an alternator and regulator which minimizes the risk of prolonged crank times and delayed stable idle conditions due to the operation of the alternator.

The invention comprises, in one form thereof, an alternator for a vehicle having an engine and a charging system with a battery. The alternator includes a stator having at least one stator winding and a field coil rotatable relative to the stator winding and which is adapted to be rotated by mechanical energy from the engine. A voltage regulator is configured to regulate an output voltage of the alternator by controlling a field current through the field coil. The regulator has a strobe mode and a normal duty mode wherein, in the strobe mode, the regulator introduces a pulsed current into the field coil and, in the normal duty mode, introduces an electrical current into the field coil at a controllably varied voltage to thereby control the output voltage of the alternator. During starting of the engine, the regulator is initially in the strobe mode and is released into the normal duty mode based upon properties of the electrical current generated in the stator winding. A lockout circuit is configured to maintain the field coil in the strobe mode until a voltage of the charging system exceeds a threshold value wherein the threshold value varies as a function of a temperature value.

In some embodiments, the threshold value increases as the temperature value decreases. In still other embodiments, the temperature value is a function of the temperature of the lockout circuit. In yet other embodiments, the lockout circuit further includes a timing circuit configured to maintain the regulator in the strobe mode until the voltage of the charging system exceeds the threshold value for a predefined period of time.

The invention comprises, in another form thereof, a charging system for a vehicle having an engine that includes a battery coupled with the charging system, a starter coupled with the charging system and adapted to be coupled with the engine and an alternator coupled with the charging system and adapted to be coupled with the engine. The alternator has at least one field coil rotatable with mechanical energy generated by the engine and at least one stator winding wherein rotation of the field coil when energized generates an electrical current in the stator winding. A voltage regulator is configured to regulate an output voltage of the alternator by controlling a field current through the field coil. The regulator has a strobe mode and a normal duty mode. In the strobe mode, the regulator introduces a pulsed current into the field coil and, in the normal duty mode, the regulator introduces an electrical current into the field coil at a controllably varied voltage to thereby control the output voltage of the alternator. During starting of the engine, the regulator is initially in the strobe mode and is released into the normal duty mode based upon properties of the electrical current generated in the stator winding. A lockout circuit is configured to block communication of electrical current from the stator winding to the regulator before the voltage of the charging system exceeds a threshold value and communicate electrical current from the stator winding to the regulator after the charging system exceeds the threshold value wherein the threshold value varies as a function of a temperature value and wherein the threshold value increases as the temperature value decreases.

In some embodiments, the lockout circuit includes a MOSFET transistor configured to selectively block or permit communication of the electrical current generated in the stator winding to the regulator. The lockout circuit may further include a Zener diode and NPN transistor responsively coupled to the charging system and arranged to control operation of the MOSFET transistor. Advantageously, the temperature value is a function of the temperature of the Zener diode and the NPN transistor.

The invention comprises, in yet another form thereof, a method of starting an engine of a vehicle having a charging system with a starter coupled with the engine, a battery, and an alternator. The alternator includes a stator with at least one stator winding, at least one field coil is rotatable relative to the stator winding, and a regulator configured to regulate an output voltage of the alternator by controlling a field current through the field coil. The method includes activating the starter, placing the field coil in a strobe mode by introducing a pulsed current into the field coil, and maintaining the field coil in the strobe mode until a voltage of the charging system exceeds a threshold value wherein the threshold value varies as a function of temperature. The method also includes monitoring the stator winding with the regulator after satisfying threshold value and entering a normal duty mode wherein the regulator introduces an electrical current into the field coil at a controllably varied voltage to thereby control the output voltage of the alternator when the regulator determines that the properties of the electrical current generated in the stator winding satisfy predetermined conditions.

In some embodiments, the threshold value advantageously increases as the temperature value decreases. The method may also include the step of maintaining the field coils in the strobe mode until the voltage of the charging system exceeds the threshold value for a predefined period of time.

In some embodiments, the step of maintaining the field coil in strobe mode includes blocking communication of electrical current from the stator winding to the regulator before the voltage of the charging system exceeds the threshold value and communicating electrical current from the stator winding to the regulator after the charging system exceeds the threshold value. The method may also include providing a MOSFET transistor configured to selectively block or permit communication of the electrical current generated in the stator winding to the regulator. In such an embodiment, the method may additionally include providing a Zener diode and NPN transistor arranged to control operation of the MOSFET transistor wherein the temperature value is a function of the temperature of the Zener diode and the NPN transistor.

BRIEF DESCRIPTION OF THE DRAWINGS

The above mentioned and other features of this invention, and the manner of attaining them, will become more apparent and the invention itself will be better understood by reference to the following description of an embodiment of the invention taken in conjunction with the accompanying drawings, wherein.

Figure 1:
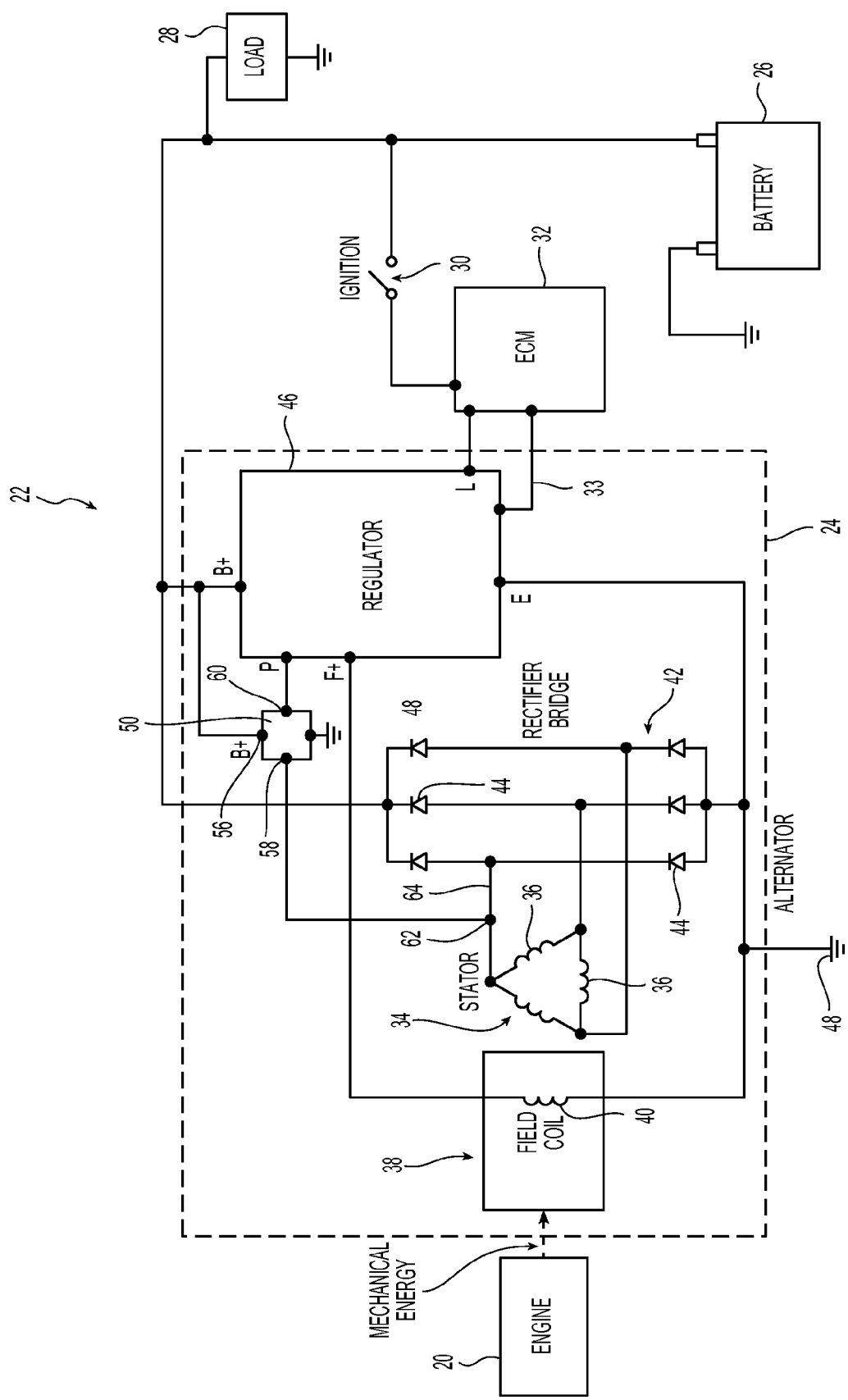
FIG. 1 is a schematic representation of a vehicle engine and charging system.

Corresponding reference characters indicate corresponding parts throughout the several views. Although the exemplification set out herein illustrates an embodiment of the invention, in one form, the embodiment disclosed below is not intended to be exhaustive or to be construed as limiting the scope of the invention to the precise form disclosed.

DETAILED DESCRIPTION

Conventional regulators have different operating modes during which different levels of current are supplied to the field coils of the alternator. These different levels are often described as a percentage of the full duty cycle which corresponds to the maximum achievable current in the field coils. For example, many alternators have a nominal 2 ohm field (typically 1.8 ohms) and a maximum achievable current of about 6 to 7 amps.

The different operating modes can be broadly categorized as either a strobe mode or a normal duty mode. In the strobe mode, the regulator introduces pulsed current into the field coil in a square wave pattern. In the normal duty mode, the regulator introduces an electrical current into the field coil at a controllably varied voltage to thereby control the output voltage of the alternator.

During the initial start-up of the vehicle the regulator and field coil are in the strobe mode and the regulator applies a strobe voltage to the field at approximately 12% of the full duty cycle. The effective full duty cycle percentage of the strobe mode may differ for alternative embodiments and it is advantageously less than about 20% of the full duty cycle. This reduced voltage allows the regulator to sense the operating characteristics of the alternator but does not draw a significant torque from the engine. It is noted that this reduced level of the fully duty cycle is due to the strobed nature of the current supplied to the field coil. The individual peaks of the square wave pattern correspond more closely to the full duty cycle of the alternator.

When the vehicle is first started, the voltage of the charging system is drawn down as the starter motor draws current from the battery and the voltage drops significantly, often to a level of about 5 volts in a common passenger car having a nominal 12 volt charging system. After the engine starts and the voltage of the charging system rises, the regulator will increase the field voltage of the alternator to a full field condition at about 98% of the full duty cycle. This full field condition percentage may vary slightly as the regulator adjusts the field voltage to account for changes in the engine speed and variations in the electrical loads.

When the alternator is at full field condition, it is not uncommon in a conventional passenger car for the alternator to draw 3 to 4 horsepower from the engine. If the alternator reaches full field condition while the starter is still cranking the engine, this will likely prolong the cranking time and delay when the engine reaches a stable idle condition. This is most likely to occur under cold weather conditions.

Under normal operating conditions, if the charging system reaches an upper level threshold, e.g., 14.5 volts, the regulator will lower the field voltage from the full field condition to a low duty condition which often corresponds to about 6 or 7% of the full duty cycle. Both the full field condition and the low duty condition are normal duty modes as that term is used herein. In such normal duty modes, the engine is intended to be operating stably and the regulator adjusts the voltage of the field coil to an appropriate percentage of the full duty cycle to control the output voltage of the alternator and thereby maintain a desired voltage in the charging system and battery coupled to the charging system. The use of a regulator to implement such a strobe mode and normal duty modes in a vehicle alternator is known and is well understood by a person having ordinary skill in the art.

FIG. 1 schematically depicts a vehicle which includes the lockout function described herein. The vehicle, which may take the form of a passenger automobile, has an internal combustion engine 20 and a charging system 22. Charging system 22 includes an alternator 24, a battery 26, and a starter motor 28 which creates a load on the charging system when activated to crank engine 20. Also coupled with charging system 22 is an ignition switch 30 and an electronic control module ("ECM") 32. The operator of the vehicle cranks, i.e., activates, starter motor 28 by closing ignition switch 30 in a conventional manner. Closing of ignition switch 30 is communicated to regulator 46 through ECM 32 to terminal L of regulator 46 in the illustrated example. ECM 32 is a conventional ECM and controls the operation of the engine and many of the other vehicle systems. Line 33 provides electrical communication between regulator 46 and ECM 32 for the exchange of data and control signals.

Alternator 24 includes a stator 34 having a plurality of stator windings 36. In the illustrated example, alternator 24 is a three phase alternator and stator windings 36 are arranged in a delta configuration. Alternative embodiments, however, can also be used with the present invention. For example, a different number of phases or arranging the stator windings in a wye configuration could be used with alternative embodiments. Coupled with stator 34 and stator windings 26 is a rotor 38 with field coils 40. Rotor 38 is mechanically coupled to engine 20 whereby operation of engine 20 imparts mechanical energy to rotor 38 and rotates field coils 40 relative to stator windings 36 in a conventional manner well-known to those having ordinary skill in the art.

When an electrical current is introduced into field coils 40 and coils 40 are rotated relative to stator windings 36, an electrical current is generated in stator windings 36. A rectifier bridge 42 having a pair of diodes 44 for the stator windings 36 corresponding to each of the three different phases. In other words, rectifier bridge 42 has a pair of diodes 44 for each different phase coil 36. Rectifier bridge 42 converts the alternating current generated by stator windings 36 into direct current which is output by alternator 24 into charging system 22 to recharge battery 26 and power loads on charging system 22.

Regulator 46 controls the electrical current introduced into field coils 40 to regulate the voltage of the electrical current output by alternator 24 into charging system 22. Electrical communication between regulator 46 and field coils 40 is provided through terminal F+ on regulator 46. Similarly, terminal B+ on regulator 46 provides a connection between regulator 46 and charging system 22 and, thus, couples regulator 46 with battery 26. Terminal E on regulator 46 connects regulator 46 to ground which may be accomplished by a connection to the frame of the vehicle or other suitable means. Terminal P on regulator 46 provides electrical communication between regulator 46 and one of the stator windings 36 at location 62 on line 64 between one of the stator windings/phase coils 36 and rectifier bridge 42. When electrical signals are communicated from location 62 to terminal P, regulator 46 can monitor the properties of the electrical current in the one stator winding 36. A lockout circuit 50 is coupled between terminal P and location 62 and is used to control the communication of signals from location 62 to terminal P as discussed in greater detail below.

In the embodiment depicted and described herein, regulator 46 includes a printed circuit board with an integrated circuit ("IC") that controls the field voltage. Regulator 46 senses the voltage of the charging system (which includes the battery, the alternator and the various electrical loads, e.g., the starter motor). When starting the engine, regulator 46 enters the strobe mode and introduces a strobe voltage in the field coils of the alternator (e.g., 12% of the full duty cycle). The voltage of the charging system will initially be very low, e.g., 5 volts, as the starter motor draws current from the battery. Conventional regulators typically release the strobe mode and enter the normal duty mode and go to full field condition when the charging system voltage is at about 6 or 7 volts. The thresholds used to determine when this occurs may be based upon the frequency and voltage of the charging circuit and/or other parameters. For example, conventional regulators often monitor the frequency of the oscillations of the current in one stator winding/phase coil, which corresponds to the engine speed, and enter normal duty mode when the frequency reaches a threshold value. Under cold start conditions, this may result in the alternator going to a full field condition prior to the deactivation of the starter motor.

Figure 2:
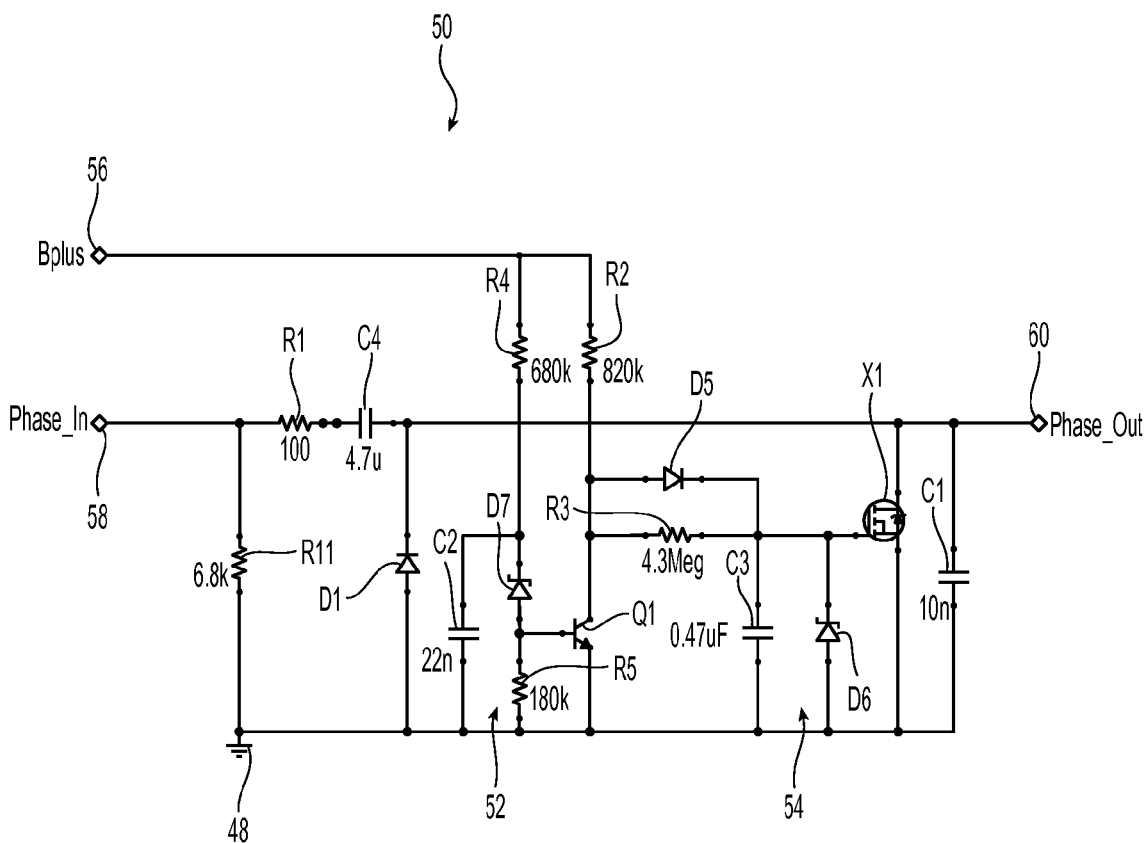
FIG. 2 is a schematic drawing of a lockout circuit which can be used to impose a limitation on the voltage of the alternator field coils.

The circuit illustrated in FIG. 2 can be used with the regulator to reduce the risk that the alternator will go to a full field condition while the starter is still activated. In FIG. 2, Bplus represents a connection to the positive terminal of the battery. Phase_In represents a connection to one of the phase coils of the alternator stator. Phase_Out represents a connection to the IC of the regulator. During operation of a multiphase alternator, most commonly three phases, the charging system voltage (which is measurable at Bplus in FIG. 2) will represent the combination of each phase after it has been converted to direct current. The lockout circuit depicted in FIG. 2 may be located in only one of the phases with regulator 46 using the characteristics of one phase to control operation of the alternator.

In the lockout circuit 50 depicted in FIG. 2, resistors R1 and R11, capacitor C4, diode D1 and capacitor C1 act together as a DC blocking filter and act as a high low band pass filter separate from the lockout function.

The remaining components of lockout circuit 50 function as a lockout wherein MOSFET X1 is used to shunt electrical current from location 63 to ground 48 or permit it to be communicated to Terminal P of regulator 46. Lockout circuit 50 is advantageously configured to shunt the phase voltage to ground while the starter is still activated. By shunting the phase voltage to ground and blocking the communication of electrical current from location 63 to terminal P, regulator 46 will keep the field coils at the limited field strobe voltage, e.g., 12%. This is because, in the illustrated example, regulator 46 monitors the properties of the electrical current in one of the stator windings 36 and enters the normal duty mode based upon one or more of the properties exceeding a threshold value. By blocking the signal from location 63 to regulator 46, the lockout circuit prevents regulator 46 acting on a change in the properties of the electrical current in stator windings 36 and thereby maintains the regulator 46 and field coils 40 in strobe mode.

Zener diode D7 in cooperation with NPN transistor Q1 is used to open and close MOSFET X1 and thereby determine whether the phase voltage is shunted to ground 48 or communicated to regulator 46. When the starter is cranked, the voltage of charging system 22 will collapse, e.g., to 5 volts in a 12 volt system. This low voltage will be communicated to lockout circuit 50 at terminal 56, i.e., the B+ terminal. Initially, at low charging system voltages, Q1 prevents the flow of current from B+ therethrough. As the voltage of the charging system rises, it eventually passes a threshold value, the breakdown voltage of Zener diode is exceeded providing a sufficient cut-in voltage to Q1 and Q1 permits the flow of electrical current from B+ therethrough. The flow of current through Q1 turns MOSFET X1 off and allows electrical current from location 63 to be communicated to Terminal P. Zener diode D6 functions as a surge protector while capacitor C2 filters the signal from B+ and thereby acts as a low pass filter for Q1.

When Q1 blocks the passage of current therethrough, C3 is charged and X1 is turned on shunting electrical current from the phase_in terminal 58 to ground 48. When X1 turns off, X1 allows signals from stator winding 36 to be communicated from the phase_in terminal 58 to the phase_out terminal 60 and, from there, to terminal P of regulator 46.

Zener diode D7, NPN transistor Q1 and resistors R4 and R5 form a temperature sensitive voltage threshold circuit 52 which performs a temperature compensating function such that the charging system voltage required to close Q1 and thereby turn off X1 and allow regulator 46 to enter normal duty mode which will result in raise the voltage of the alternator field coils to full field condition is reduced as the temperature increases. In other words, the threshold value of the charging system voltage increases as a temperature value decreases. In the illustrated embodiment, the temperature value corresponds to the temperature of the lockout circuit and, even more specifically, is primarily, although not exclusively, dependent upon the temperature of Zener diode D7 and transistor Q1. In other words, the temperature value is a function of the temperature of lockout circuit 50 and, more specifically, a function of Zener diode D7 and NPN transistor Q1.

In the illustrated embodiment, the voltage threshold drops by approximately 20 millivolts for each 1° C. increase in the temperature. Thus, in the illustrated embodiment, the threshold voltage will be approximately 9.2 volts when the temperature is 0° C. and will be approximately 7.2 volts when the temperature is 100° C. As mentioned above, this is the temperature of the lockout circuit, not the temperature of the surrounding environment.

Although the lockout circuit will be at the temperature of the surrounding ambient environment when initially starting a vehicle in extremely cold conditions after the vehicle has been sitting for several hours without running, the temperature of the lockout circuit, which will be located within or proximate the alternator, will be significantly higher after the engine of the vehicle has reached normal operating temperatures. For example, it is not uncommon for alternators to be cooled with blown air which is at a temperature of 125° C. Thus, as a practical matter, once the engine has reached normal operating temperatures, the temperature compensating function of lockout circuit 50 will effectively prevent the lockout circuit from shunting the phase voltage to ground. As a result, lockout circuit 50 provides protection for extremely cold conditions and generally only provides lockout protection, i.e., shunting phase voltage to ground and maintaining field coils in a prolonged strobe mode, when low temperatures require it.

Lockout circuit 50 also provides a time delay function with diode D5, capacitor C3 and resistor R3 forming a timing circuit 54 and cooperating to prevent transient spikes in the charging system voltage from repeatedly opening and closing MOSFET X1. In the illustrated embodiment, these components cooperate to provide an approximately 1 second delay. As a result, the charging system voltage must exceed the threshold value and turn on Q1 for a predefined period of time of approximately one second before X1 will be turned off and circuit 50 will communicate electrical signals from stator winding 36 to regulator 46 instead of shunting them to ground 48. In this regard, it is noted that the delay time period is predefined by the operating characteristics of circuit 50, it does not require that each time period of delay be precisely equivalent.

In the illustrated embodiment, lockout circuit 50 results in regulator 46 entering normal duty mode and initiating full field condition (e.g., 98% full duty cycle) when the voltage of the charging system 22 is approximately 10 volts and the lockout circuit is at −40° C. The illustrated lockout circuit, however, only imposes such an elevated the threshold voltage when the vehicle is subjected to cold temperatures which are likely to make starting engine 20 difficult. It is also noted that it is possible for the regulator 46 to jump immediately to a low duty condition instead of a full field condition when it enters normal duty mode, however, the vast majority of starting conditions will result in the immediate entry into a full field condition when regulator 46 enters normal duty mode after the start of engine 20.

Figure 3:
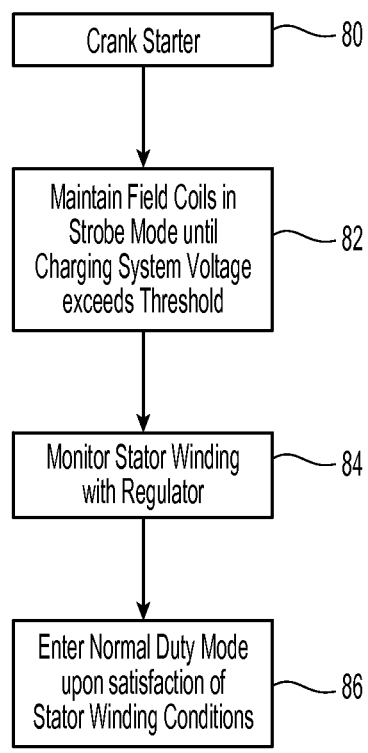
FIG. 3 is a flow chart representing the use of the lockout circuit of FIG. 2.

The flow chart set forth in FIG. 3 represents the starting of the vehicle schematically depicted in FIG. 1. Box 80 represents when the driver of the vehicle closes ignition switch 30 and cranks, i.e., activates, starter 28 which then draws current from battery 26 to impart mechanical energy to engine 20. As starter 28 is cranked, regulator 46 enters strobe mode and places field coils 40 into strobe mode by introducing pulsed current into coils 40. As represented by box 82, the field coils are maintained in the strobe mode by the operation of circuit 50 until the voltage of charging system 22 exceeds a threshold value. As discussed above, the threshold value of the charging system voltage varies as a function of a temperature value. Once the threshold value of the charging system voltage is exceeded, at least one of the stator windings/phase coils 36 is monitored by regulator 46 as represented by box 84. In the illustrated embodiment, lockout circuit 50 communicates electrical signals from location 62 to terminal P to allow for such monitoring.

As depicted by box 86, regulator 46 enters normal duty mode when regulator 46 determines that the properties of the electrical current generated in the stator winding satisfy one or more predetermined conditions. For example, lockout circuit 50 is well suited for use with a conventional regulator 46 that monitors the frequency of the oscillations of the voltage of the electrical current in one of the stator windings 36 and enters normal duty mode when the frequency of the oscillations exceeds a predetermined threshold. These oscillations correspond to the compression cycle of the engine and, thus, the engine speed. In the embodiment depicted in FIG. 1, regulator 46 sets a threshold value for such oscillations and enters the normal duty mode upon exceeding a predetermined frequency. Thus, if circuit 50 were removed from the vehicle depicted in FIG. 1, the vehicle would have a conventional structure and operate in a conventional manner. While setting a threshold for entering normal duty mode based on engine speed will generally prevent entry into the normal duty mode while the starter is still cranking, under cold weather conditions, this may not be the case. The use of lockout circuit 50, however, greatly reduces this unwanted possibility.

Figure 4:
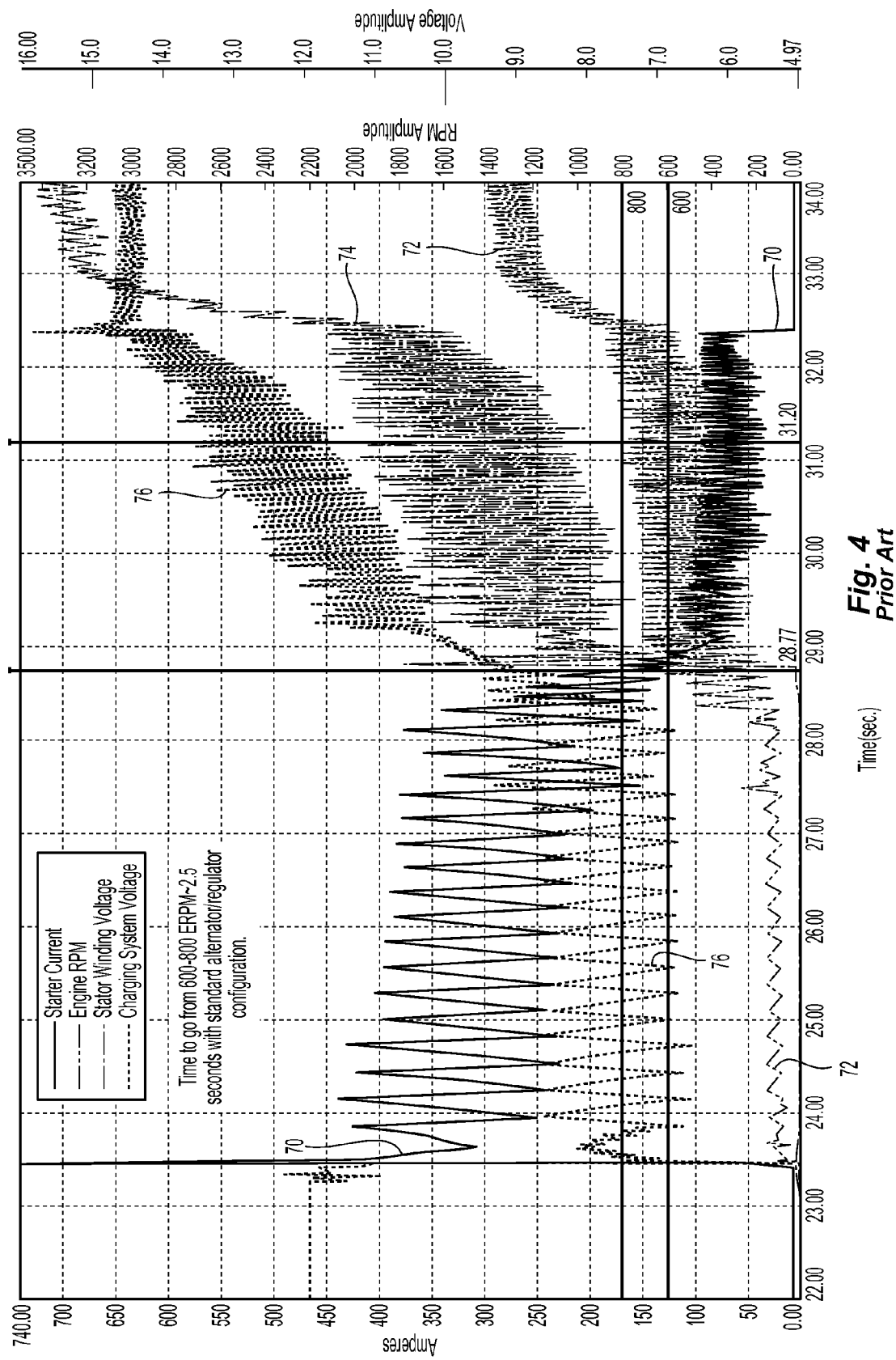
FIG. 4 is a chart illustrating measured parameters while starting a vehicle under cold conditions without the lockout circuit of FIG. 2.
Figure 5:
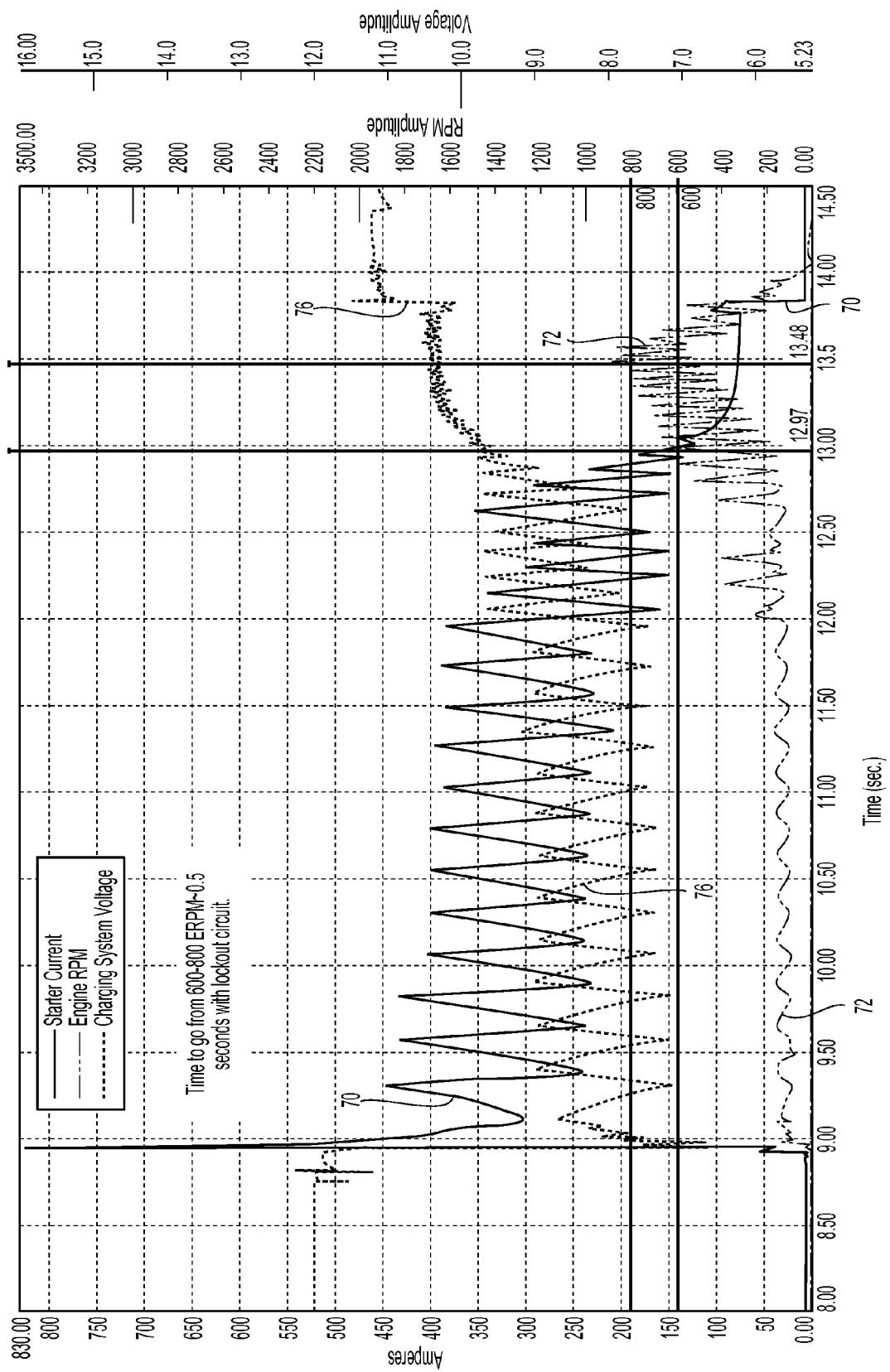
FIG. 5 is a chart illustrating measured parameters while starting a vehicle under cold conditions with the lockout circuit of FIG. 2.

FIGS. 4 and 5 are testing data charts that illustrate the impact of lockout circuit 50. FIG. 4 illustrates testing data wherein a vehicle without lockout circuit 50 was started under cold conditions. FIG. 5 illustrates a similar vehicle started under similar cold conditions but which included a lockout circuit 50.

It is noted that FIG. 1 schematically depicts the vehicle with the operating characteristics of FIG. 5. The vehicle with the operating characteristics of FIG. 4, is the same as that depicted in FIG. 1 except that the vehicle with the operating characteristics of FIG. 4 does not include lockout circuit 50. In this regard, it is noted that lockout circuit 50 can be added to some existing vehicles without any other modification to the vehicle to enhance the cold-weather starting of the vehicle.

The charts of FIGS. 4 and 5 show that the time required for the engine to go from 600 to 800 rpm was reduced from 2.5 second to 0.5 seconds by the use of lockout circuit 50. The time required to go from 600 to 800 rpm is not identical to the starting or cranking time of a vehicle but it is representative of the required time and a vehicle that requires a shorter time period to go from 600 rpm to 800 rpm will generally take a shorter time to start.

Turning first to the chart of FIG. 4, line 70 represents the starter motor current with the oscillations corresponding to the compression cycle of the engine. Line 72 represents the engine speed and line 76 represents the charging system voltage. Line 74 represents the phase voltage, in other words, the output of the alternator. The chart in FIG. 5 uses similar lines but the phase voltage is not shown for purposes of graphical clarity.

While this invention has been described as having an exemplary design, the present invention may be further modified within the spirit and scope of this disclosure. This application is therefore intended to cover any variations, uses, or adaptations of the invention using its general principles.

What is claimed is:

1. An alternator for a vehicle having an engine and a charging system with a battery; the alternator comprising:
    a stator having at least one stator winding;
    a field coil rotatable relative to the stator winding and adapted to be rotated by mechanical energy from the engine;
    a voltage regulator configured to regulate an output voltage of the alternator by controlling a field current through the field coil, the regulator having a strobe mode and a normal duty mode wherein, in the strobe mode, the regulator introduces a pulsed current into the field coil and, in the normal duty mode, introduces an electrical current into the field coil at a controllably varied voltage to thereby control the output voltage of the alternator and wherein, during starting of the engine, the regulator is initially in the strobe mode and is released into the normal duty mode based upon properties of the electrical current generated in the stator winding; and
    a lockout circuit configured to maintain the field coil in the strobe mode until a voltage of the charging system exceeds a threshold value wherein the threshold value varies as a function of a temperature value.

2. The alternator of claim 1 wherein the threshold value increases as the temperature value decreases.

3. The alternator of claim 2 wherein the temperature value is a function of the temperature of the lockout circuit.

4. The alternator of claim 1 wherein the lockout circuit further comprises a timing circuit configured to maintain the regulator in the strobe mode until the voltage of the charging system exceeds the threshold value for a predefined period of time.

5. The alternator of claim 1 wherein the lockout circuit is configured to block communication of electrical current from the stator winding to the regulator before the voltage of the charging system exceeds the threshold value and is configured to communicate the electrical current from the stator winding to the regulator after the charging system exceeds the threshold value.

6. The alternator of claim 5 wherein the lockout circuit includes a MOSFET transistor configured to selectively block or permit communication of the electrical current from the stator winding to the regulator.

7. The alternator of claim 6 wherein the lockout circuit further includes a Zener diode and NPN transistor responsively couplable to the charging system and arranged to control operation of the MOSFET transistor.

8. The alternator of claim 7 wherein the temperature value is a function of the temperature of the Zener diode and the NPN transistor.

9. The alternator of claim 6 wherein the lockout circuit further comprises a timing circuit configured to permit communication of the electrical current from the stator winding to the regulator only if the voltage of the charging system exceeds the threshold value for a predefined period of time.

10. A charging system for a vehicle having an engine comprising:
    a battery coupled with the charging system;
    a starter coupled with the charging system and adapted to be coupled with the engine;
    an alternator coupled with the charging system and adapted to be coupled with the engine, the alternator having at least one field coil rotatable with mechanical energy generated by the engine and at least one stator winding wherein rotation of the field coil when energized generates an electrical current in the stator winding; and
    a voltage regulator configured to regulate an output voltage of the alternator by controlling a field current through the field coil, the regulator having a strobe mode and a normal duty mode wherein, in the strobe mode, the regulator introduces a pulsed current into the field coil and, in the normal duty mode, introduces an electrical current into the field coil at a controllably varied voltage to thereby control the output voltage of the alternator and wherein, during starting of the engine, the regulator is initially in the strobe mode and is released into the normal duty mode based upon properties of the electrical current generated in the stator winding; and
    a lockout circuit configured to block communication of the electrical current from the stator winding to the regulator before the voltage of the charging system exceeds a threshold value and communicate the electrical current from the stator winding to the regulator after the charging system exceeds the threshold value wherein the threshold value varies as a function of a temperature value and wherein the threshold value increases as the temperature value decreases.

11. The alternator of claim 10 wherein the lockout circuit includes a MOSFET transistor configured to selectively block or permit communication of the electrical current generated in the stator winding to the regulator.

12. The alternator of claim 11 wherein the lockout circuit further includes a Zener diode and NPN transistor responsively coupled to the charging system and arranged to control operation of the MOSFET transistor.

13. The alternator of claim 12 wherein the temperature value is a function of the temperature of the Zener diode and the NPN transistor.

14. The alternator of claim 13 wherein the lockout circuit further comprises a timing circuit configured to permit communication of the electrical current generated in the stator winding to the regulator only if the voltage of the charging system exceeds the threshold value for a predefined period of time.

15. A method of starting an engine of a vehicle having a charging system with a starter coupled with the engine, a battery, and an alternator wherein the alternator includes a stator with at least one stator winding, at least one field coil rotatable relative to the stator winding, and a regulator configured to regulate an output voltage of the alternator by controlling a field current through the field coil; the method comprising:
    activating the starter;
    placing the field coil in a strobe mode by introducing a pulsed current into the field coil;
    maintaining the field coil in the strobe mode until a voltage of the charging system exceeds a threshold value wherein the threshold value varies as a function of temperature;

monitoring the stator winding with the regulator after satisfying the exceeding of the threshold value; and entering a normal duty mode wherein the regulator introduces an electrical current into the field coil at a controllably varied voltage to thereby control the output voltage of the alternator when the regulator determines that the properties of the electrical current generated in the stator winding satisfy predetermined conditions.

16. The method of claim 15 wherein the threshold value increases as the temperature value decreases.

17. The method of claim 15 further comprising the step of maintaining the field coil in the strobe mode until the voltage of the charging system exceeds the threshold value for a predefined period of time.

18. The method of claim 15 wherein the step of maintaining the field coils in strobe mode comprises blocking communication of electrical current from the stator winding to the regulator before the voltage of the charging system exceeds the threshold value and communicating electrical current from the stator winding to the regulator after the charging system exceeds the threshold value.

19. The method of claim 18 further comprising the step of providing a MOSFET transistor configured to selectively block or permit communication of the electrical current generated in the stator winding to the regulator.

20. The method of claim 19 further comprising the step of providing a Zener diode and NPN transistor arranged to control operation of the MOSFET transistor wherein the temperature value is a function of the temperature of the Zener diode and the NPN transistor.

* * * * *